US010754696B1

(12) United States Patent
Chinnam et al.

(10) Patent No.: US 10,754,696 B1
(45) Date of Patent: Aug. 25, 2020

(54) SCALE OUT CAPACITY LOAD-BALANCING FOR BACKUP APPLIANCES

(71) Applicant: EMC IP Holding Company LLC, Hopkinton, MA (US)

(72) Inventors: Shobhan Chinnam, Cupertino, CA (US); George Mathew, Belmont, CA (US); Terry Gene Hahn, Los Altos, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 194 days.

(21) Appl. No.: 15/655,792

(22) Filed: Jul. 20, 2017

(51) Int. Cl.
| G06F 11/14 | (2006.01) |
| G06F 16/16 | (2019.01) |
| G06F 16/17 | (2019.01) |
| G06F 9/50 | (2006.01) |
| G06F 16/174 | (2019.01) |

(52) U.S. Cl.
CPC .......... *G06F 9/505* (2013.01); *G06F 11/1464* (2013.01); *G06F 16/162* (2019.01); *G06F 16/1727* (2019.01); *G06F 16/1748* (2019.01); *G06F 2201/80* (2013.01); *G06F 2209/505* (2013.01)

(58) Field of Classification Search
None
See application file for complete search history.

(56) References Cited

U.S. PATENT DOCUMENTS

| 8,219,769 | B1 * | 7/2012 | Wilk | G06F 11/1464 |
| | | | | 707/640 |
| 8,554,918 | B1 * | 10/2013 | Douglis | G06F 11/3485 |
| | | | | 707/640 |
| 9,344,493 | B1 * | 5/2016 | Anand | H04L 67/2861 |
| 9,367,557 | B1 * | 6/2016 | Lin | G06F 16/1744 |
| 9,626,253 | B1 * | 4/2017 | Zhang | G06F 11/1458 |
| 9,678,981 | B1 * | 6/2017 | Taylor | G06F 16/1844 |
| 9,679,040 | B1 * | 6/2017 | Davis | G06F 16/1844 |
| 9,923,827 | B2 * | 3/2018 | Mhatre | H04L 47/125 |
| 10,127,235 | B2 * | 11/2018 | Rao | G06F 16/1752 |
| 10,152,481 | B1 * | 12/2018 | Singh | G06F 16/122 |
| 2010/0191854 | A1 * | 7/2010 | Isci | G06F 1/3203 |
| | | | | 709/226 |

(Continued)

FOREIGN PATENT DOCUMENTS

WO WO-2015197564 A1 * 12/2015 .......... G06F 9/5088

OTHER PUBLICATIONS

Benjamin Zhu, "Avoiding the Disk Bottleneck in the Data Domain Deduplication File System", pp. 269-281, 2008.*

(Continued)

*Primary Examiner* — Isaac T Tecklu
(74) *Attorney, Agent, or Firm* — Staniford Tomita LLP

(57) ABSTRACT

Embodiments are directed to a load balancer process for use in a deduplication backup process implemented in a cluster system that provides ideal placement of the Mtrees on the expanded capacity by monitoring the available capacity and providing recommendations on the best node to place newly created Mtrees. Continuous monitoring of the capacity and activity level of the nodes helps identify the appropriate node to place a new Mtree. The monitoring of existing node in the cluster and balancing capacity by recommending migration of files from heavily-utilized nodes to under-utilized nodes produces an overall increase in cluster performance.

16 Claims, 7 Drawing Sheets

(56) References Cited

U.S. PATENT DOCUMENTS

| | | | |
|---|---|---|---|
| 2011/0276695 A1* | 11/2011 | Maldaner | G06F 9/5083 709/226 |
| 2012/0117028 A1* | 5/2012 | Gold | G06F 11/1451 707/640 |
| 2012/0297238 A1* | 11/2012 | Watson | G06F 9/5088 714/4.11 |
| 2012/0311603 A1* | 12/2012 | Kudo | G06F 3/0611 718/105 |
| 2012/0317249 A1* | 12/2012 | Salsburg | G06F 9/5072 709/220 |
| 2013/0024494 A1* | 1/2013 | Guarrieri | G06F 9/5061 709/203 |
| 2013/0055260 A1* | 2/2013 | Zlotkin | G06F 9/4856 718/1 |
| 2013/0110778 A1* | 5/2013 | Taylor | G06F 11/1435 707/624 |
| 2013/0151683 A1* | 6/2013 | Jain | G06F 3/0611 709/223 |
| 2014/0006465 A1* | 1/2014 | Davis | G06F 16/182 707/827 |
| 2015/0095485 A1* | 4/2015 | Alatorre | H04L 47/125 709/224 |
| 2015/0195141 A1* | 7/2015 | Luft | H04L 41/5006 709/223 |
| 2015/0278397 A1* | 10/2015 | Hendrickson | G06F 16/137 707/798 |
| 2015/0324236 A1* | 11/2015 | Gopalan | G06F 11/1453 711/162 |
| 2015/0363233 A1* | 12/2015 | Magee | G06F 9/5016 718/104 |
| 2016/0070601 A1* | 3/2016 | Yamamoto | G06F 9/5088 718/105 |
| 2016/0110260 A1* | 4/2016 | Chandrasekharan | G06F 11/1469 707/652 |
| 2016/0196089 A1* | 7/2016 | Gadre | G06F 3/0647 711/114 |
| 2016/0246655 A1* | 8/2016 | Kimmel | G06F 9/5088 |
| 2016/0261508 A1* | 9/2016 | Anantharam | H04L 67/1008 |
| 2016/0371153 A1* | 12/2016 | Dornemann | G06F 11/1458 |
| 2017/0019345 A1* | 1/2017 | Yamasaki | G06F 9/46 |
| 2017/0024135 A1* | 1/2017 | Christodorescu | G06F 3/0604 |
| 2017/0046360 A1* | 2/2017 | Therrien | G06F 16/1748 |
| 2017/0060696 A1* | 3/2017 | Wellnitz | G06F 11/1453 |
| 2017/0315838 A1* | 11/2017 | Nidugala | G06F 9/5088 |
| 2018/0032280 A1* | 2/2018 | Feigin | G06F 3/0647 |
| 2018/0081821 A1* | 3/2018 | Beaverson | G06F 3/0604 |
| 2018/0095855 A1* | 4/2018 | Sanakkayala | G06F 9/45558 |
| 2018/0139148 A1* | 5/2018 | Gamage | H04L 47/70 |
| 2019/0050249 A1* | 2/2019 | Dornemann | G06F 11/1458 |

* cited by examiner

SCALE OUT CAPACITY LOAD-BALANCING FOR BACKUP APPLIANCES

TECHNICAL FIELD

This invention relates generally to software defined storage systems, and more specifically to load balancing backup appliances in a cluster system.

BACKGROUND OF THE INVENTION

In current single-node computer systems, all clients communicate with the system and ingest data into the node. When the node is at maximum capacity with respect to resources such as memory space or processor (CPU) cycles, the user must upgrade to a bigger system to obtain greater capacity. With ever-increasing workloads, oversubscribing single node systems is a relatively common occurrence. Cluster systems represent a scale-out solution to single node systems by providing a set networked computers that work together so that they essentially form a single system. Each computer forms a node in the system and runs its own instance of an operating system. The cluster itself has each node set to perform the same task that is controlled and scheduled by software. Capacity is naturally increased based on the number of computers and is easily scalable by adding or deleting nodes, as needed.

In a cluster system, it is important that the various resources (e.g., CPU, memory, caches, etc.) in the nodes are used in a balanced manner. An unbalanced system leads to poor performance for the clients. Proper load balancing requires a comprehensive analysis of system and application needs versus the available resources in the cluster. Certain processor-intensive tasks may benefit from increased CPU capacity rather than storage capacity, while other data intensive tasks may benefit instead by increased storage capacity rather than CPU capacity. One major use of clustered systems is in deduplication backup systems where large amounts of data are migrated to backup storage media. It is relatively difficult, yet very important to maintain deduplication of data when migrating deduplicated data sets. Present load balancing systems distribute network traffic across a number of servers based on simple round robin or least connections based algorithms. Such algorithms are wholly inappropriate for deduplicated backup savesets, as deduplication is often lost during these transfers, thus eliminating any storage benefits conferred by deduplication.

What is needed, therefore, is a load balancing system for deduplication backup processes in a cluster system that maintains the integrity of the deduplicated data sets.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain (DD), Data Domain Virtual Edition (DDVE), Data Domain Restorer (DDR), and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
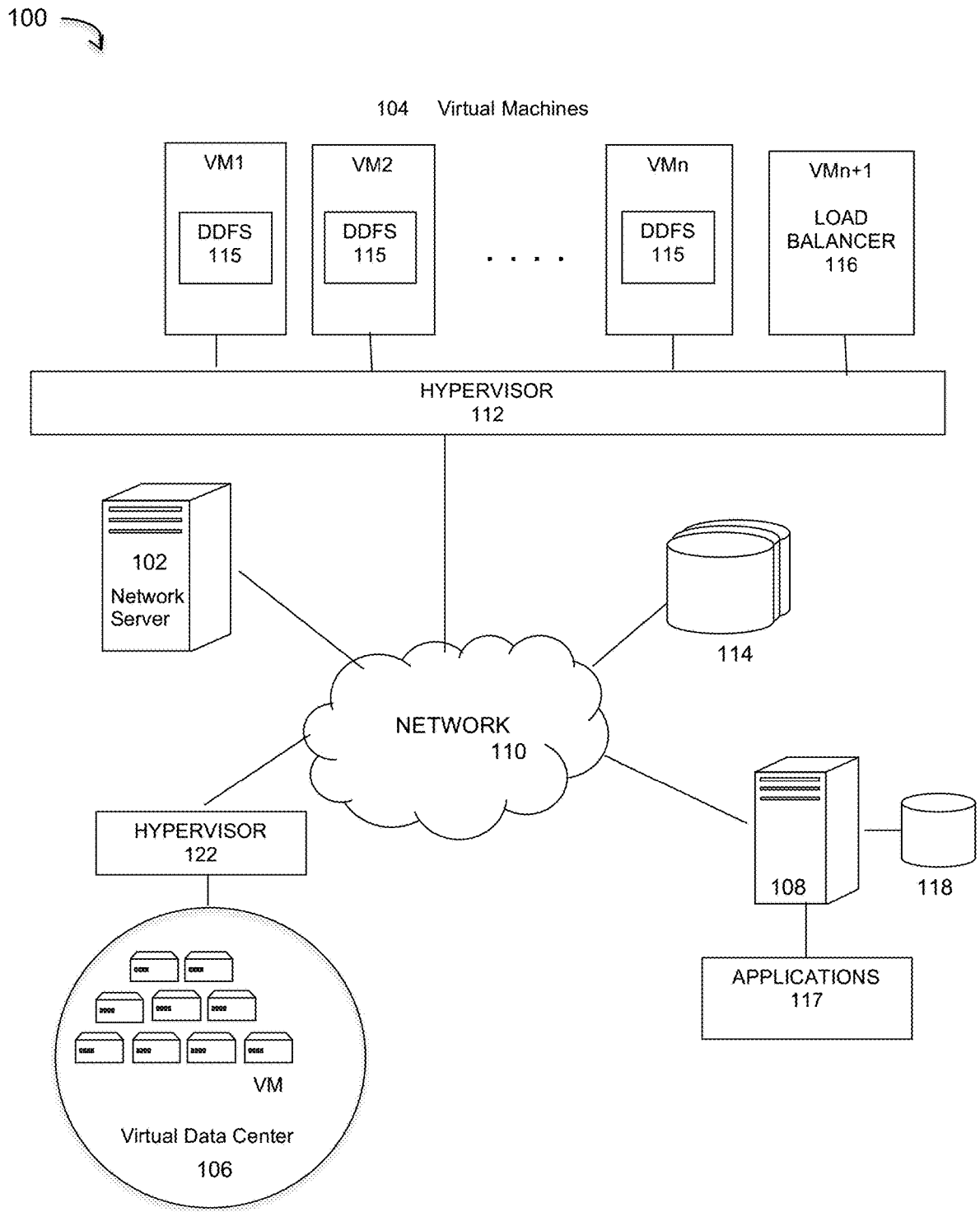
FIG. 1 illustrates a computer network system 100 that implements one or more embodiments of a load balancer for deduplication backup systems in a cluster system.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the described embodiments may take, may be referred to as techniques. In general, the order of the steps of disclosed processes may be altered within the scope of the invention.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

For the embodiment of FIG. 1, network server and client computers are coupled directly or indirectly to one another through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application.

Virtualization technology has allowed computer resources to be expanded and shared through the deployment of multiple instances of operating systems and applications run virtual machines (VMs). A virtual machine network is managed by a hypervisor or virtual machine monitor (VMM) program creates and runs the virtual machines. The server on which a hypervisor runs one or more virtual machines is the host machine, and each virtual machine is a guest machine. The hypervisor presents the guest operating systems with a virtual operating platform and manages the execution of the guest operating systems. Multiple instances of a variety of operating nay share the virtualized hardware resources. For example, different OS instances (e.g., Linux and Windows) can all run on a single physical computer.

In an embodiment, system 100 illustrates a virtualized network in which a hypervisor program 112 supports a number (n) VMs 104. A network server supporting the VMs (e.g., network server 102) represents a host machine and target VMs (e.g., 104) represent the guest machines. Target VMs may also be organized into one or more virtual data centers 106 representing a physical or virtual network of many virtual machines (VMs), such as on the order of thousands of VMs each. These data centers may be supported by their own servers and hypervisors 122.

The data sourced in system 100 by or for use by the target VMs may be any appropriate data, such as database data that is part of a database management system. In this case, the data may reside on one or more hard drives (118 and/or 114) and may be stored in the database in a variety of formats (e.g., XML or RDMS). For example, computer 108 may represent a database server that instantiates a program that interacts with the database.

The data may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (Open-Storage) devices. In a preferred embodiment, the data source storage is provided through VM or physical storage devices, and the target storage devices represent disk-based targets implemented through virtual machine technology.

FIG. 1 illustrates a computer network system 100 that implements one or more embodiments of a load balancing process 116 that is optimized for use in deduplication backup systems. For the embodiment shown in FIG. 1, each VM 104 (VM1 to VMn) runs its own Data Domain File System (DDFS) for a deduplication backup application, along with other possible applications. In the DDFS file system, protocol-specific namespaces are presented to clients/applications for accessing the logical file system layer. Some example protocol namespaces include: Data Domain Virtual Tape Library, Data Domain Boost storage units, and CIFS/NFS fileshares. Files and directories for each namespace are stored in an Mtree, which are user-defined logical partitions of the DDFS that enable more granular management of the file system. Mtree replication enables the creation of copies of Mtrees at secondary locations. In DDFS, the files and directories within Mtrees as well as Mtree snapshots, all reference the same pool of unique segments called a collection, which is made up of log-structured containers that organize the segments on disk to optimize throughput and deduplication effectiveness. Other similar data structures to Mtrees may be used, and embodiments are not so limited.

For the embodiment of system 100, the load balancer 116 is implemented in a VM (VMn+1) supported by hypervisor 112. Alternatively, it may be executed as a server-based process, such as on network server 102. Network server 102 may be a backup server that executes a deduplication backup process. The deduplication backup process may also be run partially or wholly within a VM, as well. Network server 102 may also be a server computer that supports part or all of the hypervisor 112 and 122 functions. In an embodiment, the virtual machines that use or are used as part of the deduplication backup process are implemented as part of a Data Domain Virtual Edition (DDVE) system, though embodiments are not so limited. Such VMs support the DD cloud tier for long term retention, provide multiple replication (e.g., virtual-to-physical, physical-to-virtual, and virtual-to-virtual), and utilize system support for manageability. It should be noted that other similar type of VMs and deduplication systems are also possible.

As stated above, current backup systems are typically single-node systems and do not allow for capacity expansion once the node is full. In such a case, the only way to gain capacity is to install a larger capacity system (e.g., Data Domain). In an embodiment of the load balancer system shown in FIG. 1, a scale-out approach allows for capacity expansion by spreading the Mtree namespace across the nodes, which also expands the capacity provided in the Data Domain system. In an embodiment, the load balancer process 116 provides ideal placement of the Mtrees on the expanded capacity by monitoring the available capacity and providing recommendations on the best node to place newly created Mtrees. Continuous monitoring of the capacity and activity level of the nodes helps identify the appropriate node to place a new Mtree. The monitoring of existing node in the cluster and balancing capacity by recommending migration of files from heavily-utilized nodes to under-utilized nodes produces an overall increase in cluster performance.

In a cluster system, each node hosts one or more collection partitions (CP). This collection partition contains files from different Mtrees across the cluster, and access to these files must be balanced. The load balancer addresses the issue that since there is no prior knowledge of how files in the system are accessed by providing a mechanism to balance the load based on statistical data and analytics. The statistical data is collected from the file system (e.g., DDFS). The load balancing is non-destructive (no restart of jobs) to maintain deduplication in the data sets. The automatic placement of Mtrees on nodes to allow optimal utilization of the available resources without overloading the existing resources. To balance capacity, if one node reaches a certain threshold on consumed capacity and is affecting performance, and other nodes have free space, it then can move some of the files to another node with free capacity. In general, load balancing allows for easier deployment for the customer by self-managing the available resources to achieve optimal performance and operating cost savings. Policy-driven load balancing allows customer flexibility between performance and operating cost savings.

Figure 2A:
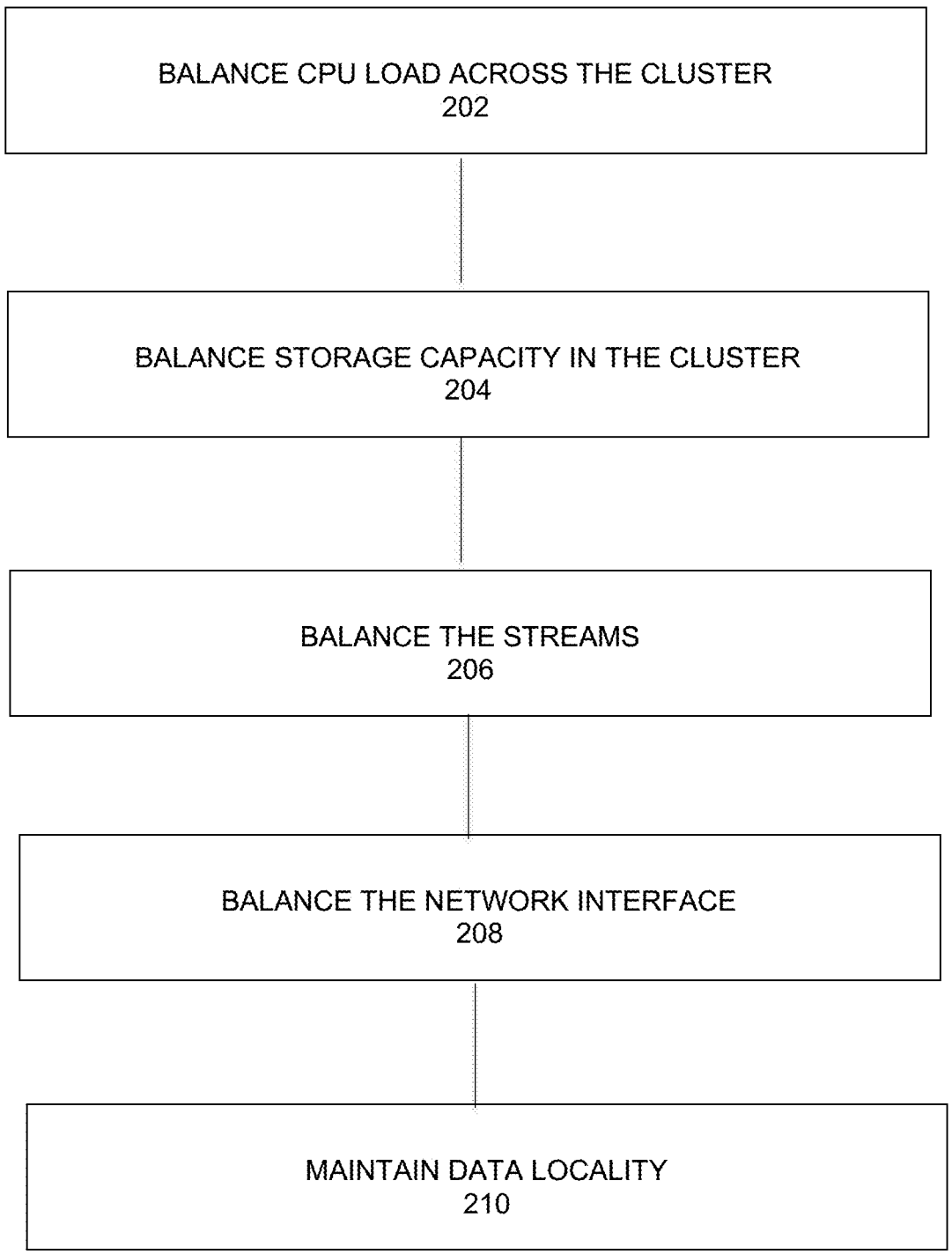
FIG. 2A is a diagram that illustrates the main functional components and processes of the load balancer of FIG. 1, under some embodiments.

FIG. 2A is a diagram that illustrates the main functional components and processes of the load balancer 116, under some embodiments. As shown in FIG. 2A, the load balancer balances the CPU load across the cluster, 202. If the CPU use in one node reaches a certain threshold and is affecting performance, and other nodes are less busy, then the load balancer can decide to either move files or data to another node or move an entire node to another node. The load balancer also balances the storage capacity in the cluster, 204. If one node reaches a certain threshold on consumed capacity and is affecting performance, and other nodes have free space, then it can decide to move some of the files to another node with free space. The third main element to be balanced are the streams 206. Depending on the amount of memory available, a node can maintain a certain number of concurrent files open at the same time, which are referred to as streams. The number of streams thus represents the number of files that can be read from or written to at same time. During runtime, some files on a node can be very active, and as this number increases, the stream capacity for the node may be met or exceeded. Once this occurs it is time to move these files to other nodes to spread out the files being accessed at same time, as excessive streams typically means excessive CPU and storage use. The load balancer distributes the stream load by distributing some of files to another (target) node.

As further shown in FIG. 2A, the load balancer also balances the network interface, 210. If one interface is close to meeting or exceeding a maximum specified line rate, then one or more network addresses associated with the interface may be moved to another interface in the same node or to an interface in another node. The load balancer also maintains data locality, 210. Using analytics, the load balancer can align the IP address with the data location. For example, using statistical data, it can be determined that a client is using a specific IP address to access a set of files in a node. If the IP address is not associated with the node being accessed, then the load balancer may decide to move the IP address to the node if the node hosting the node has sufficient CPU and network capacity.

Figure 2B:
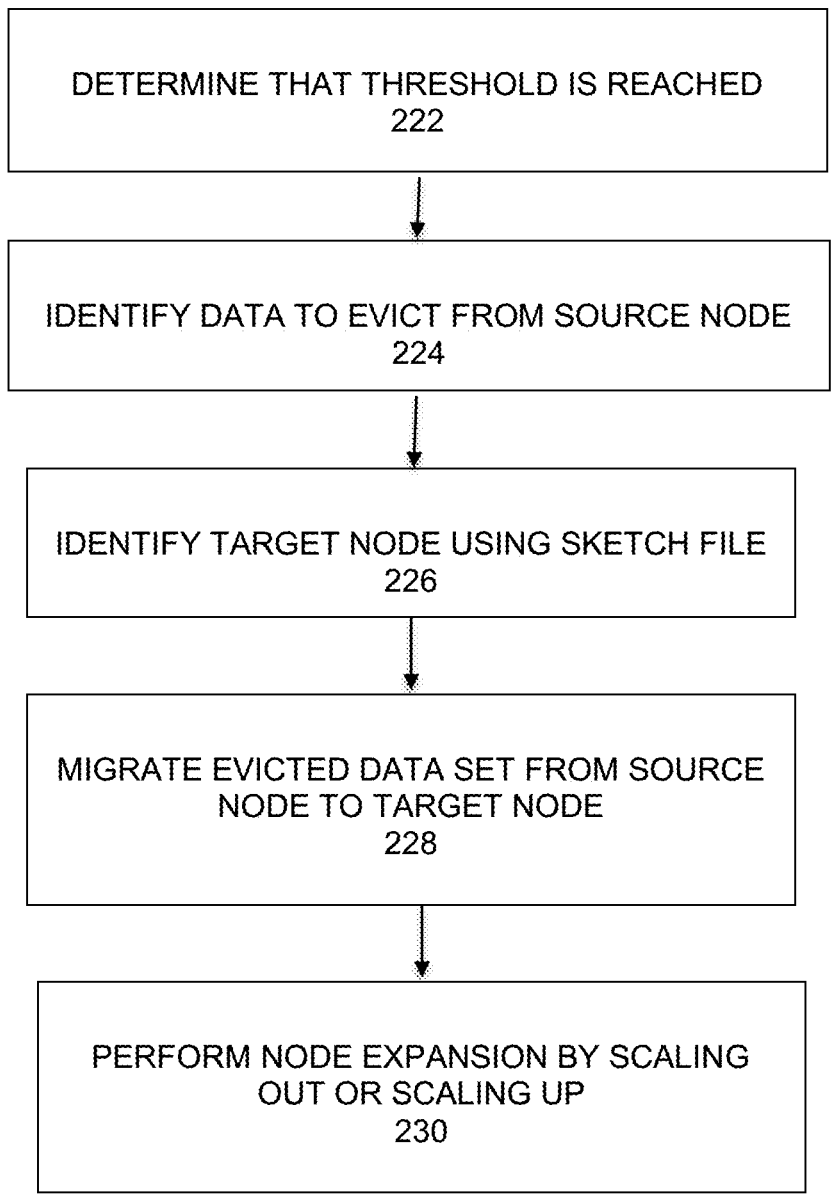
FIG. 2B is a flow chart that illustrates an overall process of load balancing a cluster system, in some embodiments

FIG. 2B is a flow chart that illustrates an overall process of load balancing a cluster system, in some embodiments. The process starts by determining that a resource threshold for a node ("source" node or "first" node) has been reached (met or exceeded) by data requests from a client, step 222. The threshold can be either a storage capacity, CPU cycle, interface line rate, or any other appropriate threshold. The threshold values act as triggers to determine whether or not the load balancer will initiate a transfer of data, file, or IP addresses from the source node to a target node. In an embodiment, the threshold values for CPU usage and storage capacity are set to default values upon system configuration and initialization, but are dynamic during runtime. That is, they can be modified by the user through inputs that tune the performance of the nodes, or, or though user policies that set performance limits or constraints on node resources. The thresholds may be expressed as an absolute value (e.g., 1 TB, 2 TB, 4 TB of storage space, etc.), or as a percentage utilization of a maximum resource (e.g., 70% max CPU cycles, etc.).

As shown in process 220, once a threshold has been reached, the load balancer determines which data to evict from the source node to move (migrate) to a target node or nodes, step 224. It also identifies the appropriate target nodes to move the data based on the available capacity. These nodes represent the candidate nodes from which the target node is selected, as typically there may be a number of nodes that have enough space to house the data. The target node is selected by finding the candidate node that has capacity and that will best maintain the deduplication of the data being moved. Thus, the first steps of process 220 first finds the data set that needs to be evicted and then finds the proper node to which to migrate it, based on target node space and maintaining deduplication.

For the embodiment of FIG. 2B, the load balancer uses a data element known as a sketch file to identify the best target node. A sketch file is a set of fingerprints of the data that is being evicted. The fingerprints are converted to the sketch file data set that allows a comparison against the candidate nodes to determine which candidate node is most suitable as the target node for the receiving the evicted data. The process compares the sketch file with all the candidate nodes to find a match based on best intersection in terms of deduplication. The candidate node with the most duplicates is the best node, since most of the evicted data set already exists in that node and only the unique segments need to be stored, thus minimizing data transfer requirements as compared to the other candidate nodes. In this step 226, the load balancer makes a request to each candidate node, which in turn sends back its sketch (which is usually automatically available for each node). The load balancer then finds the best target node based on the data set that is being evicted. Once the target node is selected, the load balancer migrates the evicted data set from the source node to the target node, step 228.

When the system capacity is reached, it may be the case that the load balancer needs to create an empty node to be filled, or increase the capacity of one or more existing nodes. The system initially starts operation with a relatively small node, and as the user increases use, there is a need to expand nodes to balance the load from the original node across the other nodes. In an embodiment, node expansion is done by a scale-out process that adds new nodes to the system to form a cluster, or increases the number of nodes in an existing cluster. In a VM environment, scale-out involves spawning new virtual machines. Any number of nodes may be added depending on system constraints and resource availability and cost. In certain cases, a user may want to limit the number of added nodes, due to cost per node considerations.

The other way to increase system capacity is to scale-up the original node or nodes. Thus, scale-up means increasing the size and capability of the nodes by increasing storage access or applying/increasing greater CPU cycles to the node. The load balancer may use credentials to request more resources, but again there may be cost constraints that the user may take into account. Nodes generally have a maximum available capacity so once this maximum for each node is reached, the system must scale-out to add any additional capacity.

Figure 3:
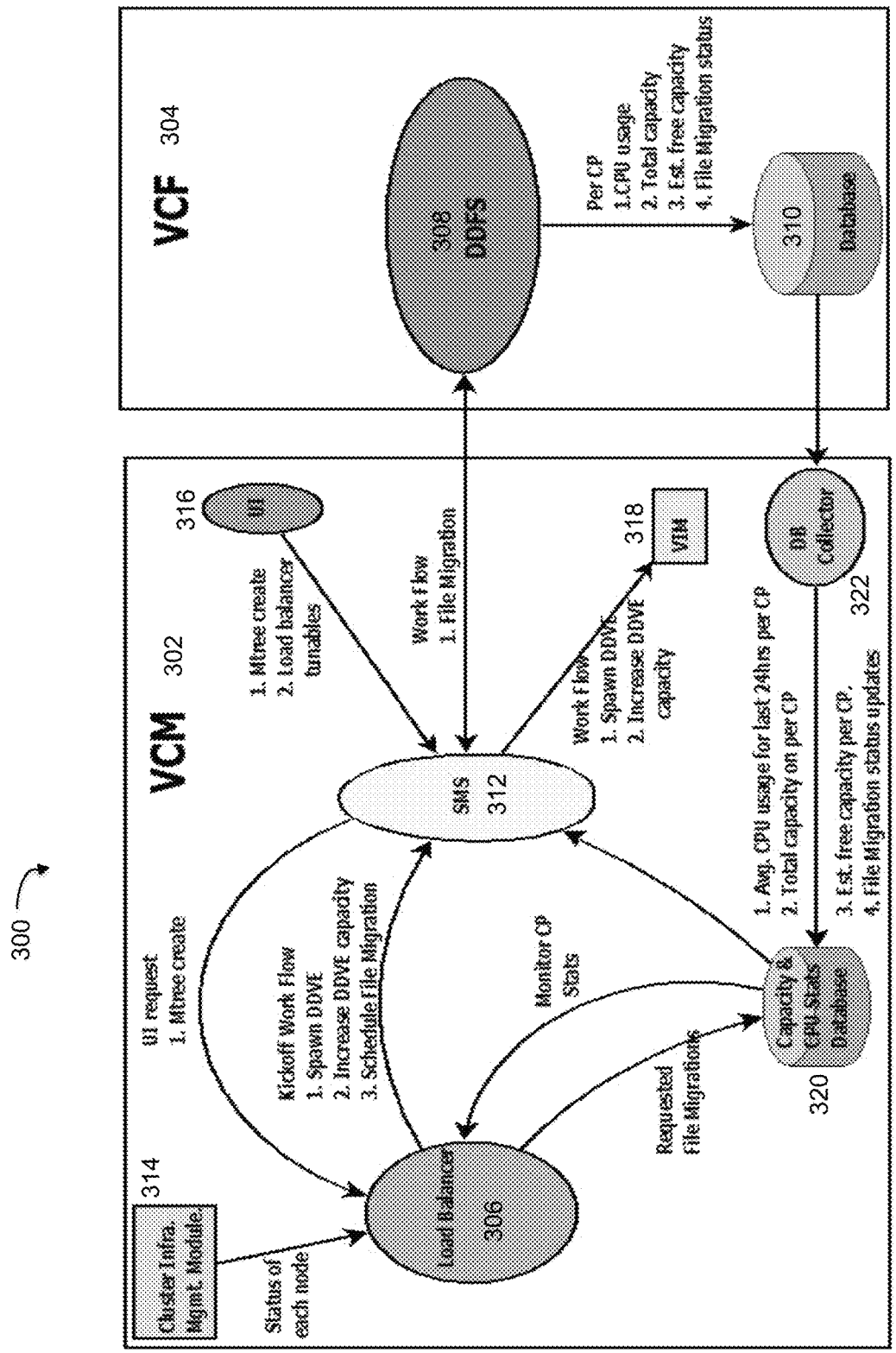
FIG. 3 is a high-level architectural and process diagram for a load balancing process in a virtualized cluster system, under some embodiments.

FIG. 3 is a high-level architectural and process diagram for a load balancing process in a virtualized cluster system, under some embodiments. For the example embodiment of system 300, the load balancer 306 runs on a node designated as the VCM (Virtual Cluster Manager) 302 as part of the cluster inventory management (CIM) process. The VCM 302 communicates with the DDFS 308 of the virtual file system domain 304 through a system manager interface (SMS) 312. The CIM 314 provides the status of each node to the load balancer 306 so that the load balancer can determine if any node is at an excessive capacity or CPU usage. The load balancer recommends or initiates data eviction from the source node and data migration to target nodes based on the node status and collection partition statistics provided by a statistics database 320. The collection partition statistics are compiled by the DDFS 308, which holds the sketches (fingerprint sets) for the nodes. These statistics comprise CPU usage, total capacity, estimated free capacity, and file migration status, all per collection partition. These are stored in a file system database 310, which are then accessed by a database collector 322 in the VCM layer. The database collector 322 provides to database 320 statistical data such as average CPU usage over a period of time (e.g., last 24 hours per P), total capacity on a node per collection partition, estimated free capacity per collection partition, and file migration status updates. These monitored collection partition stats are then returned back to the load balancer 306, as well as to system manager (SMS) 312.

When a trigger condition is reached, such as a storage or CPU threshold being reached in a source node, the load balancer initiates a work flow to off load data from the source node to one or more target nodes. The work flow could comprise spawning new nodes (e.g., DDVE VMs) and/or increasing node capacity (scale-up). It also schedules the file migration of the data set to be evicted from the source node. This workflow is sent to SMS 312, which then sends the scale-out (spawn nodes) command and/or the scale-up (increase node capacity) command to the VIM inventory manager 318. The SMS 312 also sends the file migration command to the DDFS, which performs the data migration from the source node to the target node (as identified by process 220) using its standard data/file transfer protocols. The system manager SMS 312 also receives user input 316 regarding load balancer tunables and Mtree creation.

As shown in FIG. 3, each VCF node 304 samples on a periodic basis (e.g., every minute) its CPU, storage, stream, and other usage and stores this data in its own database 310. The VCM node 302 collects this data and aggregates it into a single database 320. The load balancer 306 queries this database 320 to determine whether or not to initiate a file migration from a node that exhibits overuse based on defined storage/CPU thresholds. The file migration workflow may require an additional workflow to increase target node capacity or spawn new nodes. Sampling of node statistics may be done on any appropriate time scale, such as minutes or several minutes, and in general, data migration is done on a substantially longer time scale, such once daily or once every several hours. The act of data migration itself can be disruptive and consume system resources, so initiating data migrations based user defined policies and thresholds (trigger conditions) can be tailored based on system needs and constraints through user tunable parameters, such as threshold values, and performance/storage settings.

With regard to detailed use cases, an Mtree creation triggers work flow to create a node when the VCM 302 node is the only node in the cluster or existing nodes are out of space. The Mtree creation triggers work flow to expand an existing VCF 304 node. It identifies a node that can be expanded to activate additional storage, and provide a trigger condition alert for out of resource nodes. This alert is sent when the load balancer identifies that Mtree creation requires adding a new node or expanding an existing node, but notices that the allocated cluster is out of resources, or when it identifies that the nodes are approaching capacity limitation due to ongoing backups and wants to expand storage by adding a new node or expanding the existing node, but notices that the allocated cluster is out of resources.

Figure 4:
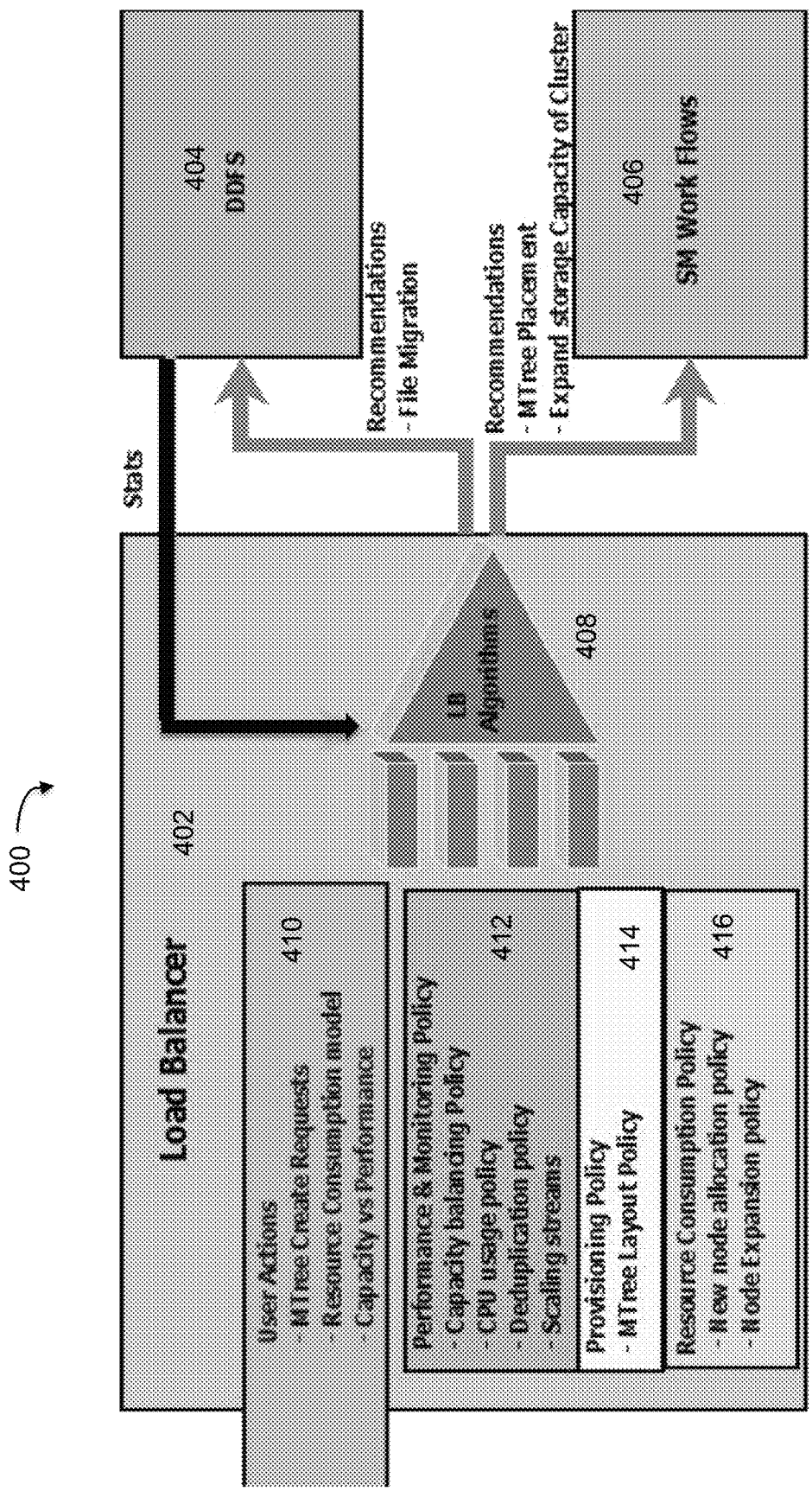
FIG. 4 illustrates functional components and processes of a load balancer under some embodiments.

FIG. 4 illustrates functional components and processes of a load balancer under some embodiments. As shown in diagram 400, load balancer 402 combines user actions 410 and defined policies 412-416 and applies load balancing algorithms 408 to provide file migration recommendations to the DDFS 404 and Mtree placement and node expansion recommendations to the system management workflows 406. In an embodiment, the user actions 410 may comprise Mtree create requests, resource consumption models, and capacity versus performance settings or selections, such as provided by a UI that allows the user to specify the tradeoff between capacity and CPU cycles. A number of policies may be defined for the load balancer. These include performance and monitoring policies 412, which comprise a capacity balancing policy, a CPU usage policy, a deduplication policy, and a scaling streams policy. The provisioning policy 414 may comprise an Mtree layout policy. The resource consumption policy 416 may comprise a new node allocation policy and a node expansion policy. The DDFS provides statistics (as shown in FIG. 3) back to the load balancer 402 to be used by the load balancing algorithm 408 to generate the appropriate recommendations to the DDFS and system manager. In an embodiment, the load balancer 408 comprises an algorithm such as a least used algorithm in case of CPU usage across node and Mtree provisioning, a round robin algorithm in the case of network interfaces across nodes, and best fit in the case of deduplication co-location of a file across different collection partitions. Other appropriate load balancer algorithms may be used as instead or as well, depending on system configuration and requirements.

Figure 5:
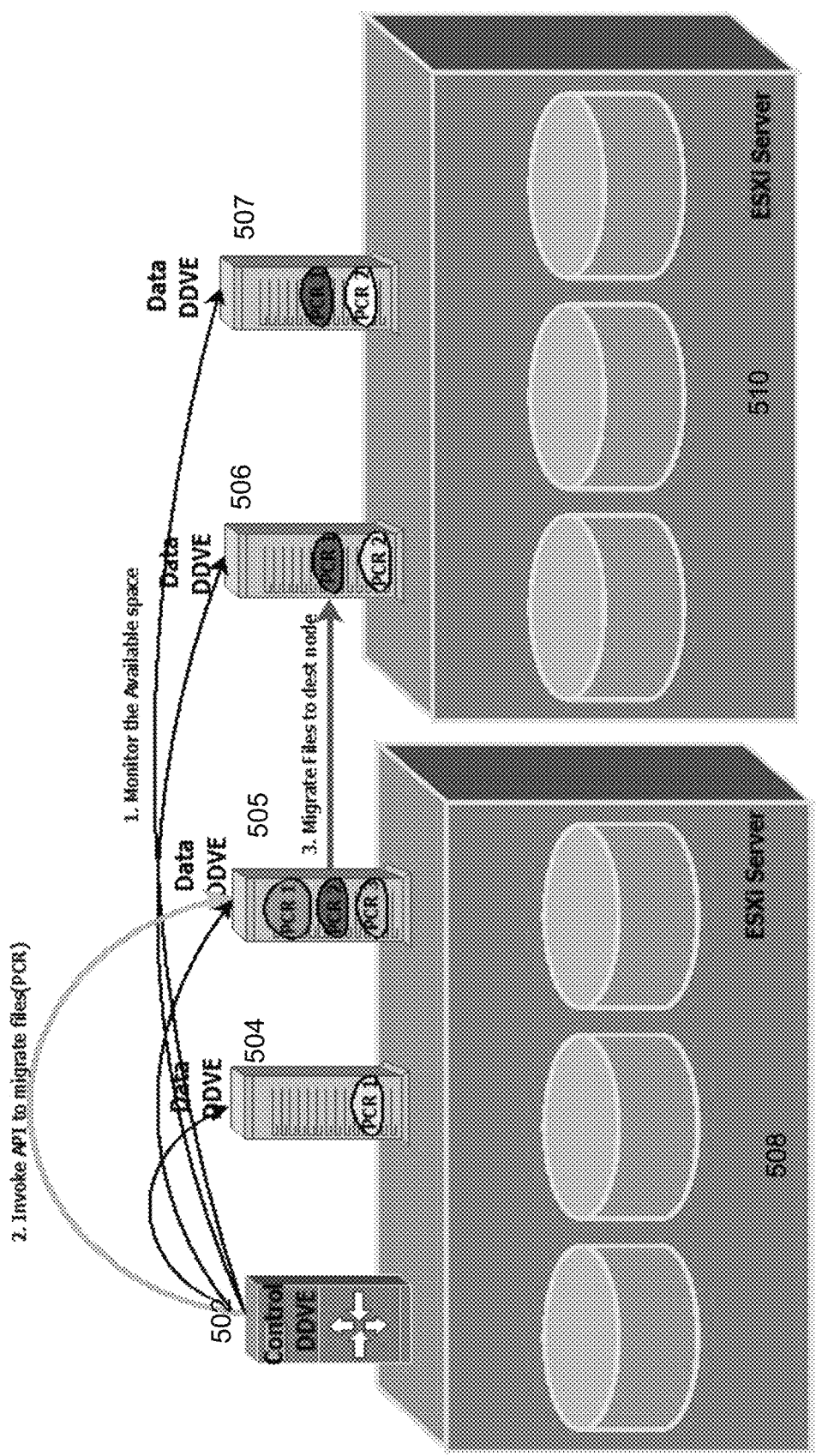
FIG. 5. illustrates a process of balancing capacity using a load balancer, under some embodiments.

FIG. 5 illustrates a system to perform capacity balancing using a load balancer, under some embodiments, which shows a number of nodes supported by servers (e.g., ESXi servers 508 and 510). Capacity balancing generally involves identifying the source that is running out of space and the destination nodes that have free space available. The CPU load and interface load are used as the triggers to determine whether or not to migrate data from one node to another by determining whether either threshold is met or exceeded. Once the trigger condition is met and the source and the destination are identified, the control node informs the source node of the destination and the data set size that needs to be transferred. To optimize performance of a deduplication system, the target node is selected so that deduplication is maintained by using the sketch data, as described above.

For the initial placement of data, during Mtree creation, the load balancer identifies a node with enough free resources and distributes the Mtrees across the VMs. It places the files in a manner that achieves maximum deduplication. For capacity balancing, it moves a set of files which provides maximum deduplication across VMs to balance the free space. For CPU/network load balancing, it moves the files to the lightly loaded nodes. In general, the system moves files to another node that has enough streams to process those files when the source node does not have enough streams (CPU/memory) to handle the number of files that are being accessed without cache thrashing (evicting useful data).

There are two main criteria that drive the file migration during the capacity balancing process. First, no node should consume above a certain maximum threshold of consumed capacity; and second, the capacity consumption should be uniform across the nodes. For the example embodiment of FIG. 5, the load balancer process 400 runs on a configuration manager module, such as the VCM (Virtual Cluster Manager) as part of the cluster inventory management (CIM) process, as stated previously. The VCM is shown as the Control DDVE 502 in FIG. 5. The load manager running on this node monitors each of the other nodes 504, 505, 506, and 507 to determine if a trigger condition is met by any of these nodes. If so, it invokes an API to migrate the evicted files from a source node (e.g., node 505). Thus, as shown, node 505 migrates files to target node 506, which has been selected by a process such as illustrated in FIG. 2B.

For the example implementation of the embodiment of FIG. 5, the load balancer selects that target node using certain factors. First, the maximum CPU and space that is provisioned but unused by the configured DDVEs, before looking for space outside the source data node (DDVE). Second, it spins up a data DDVE on a remote ESXi server (510) that is part of the cluster and has unprovisioned CPU and storage available. Third, it spins up a data DDVE on local ESXi server 508 that is part of the cluster and has unprovisioned CPU and storage available. Next, it identifies a node that has best deduplication match for each of the evicted data set (PCR) that is ready to migrate. This may include the node with most available free space and/or the least CPU usage. The node capacity increase is limited to certain sizing restrictions to get the best performance by using enough CPU and capacity.

In the process of increasing capacity of an existing DDVE, some disruption of the backups due to the need to reboot the DDVE after configuring the DDVE for additional CPU may be deemed acceptable. There could be scenarios where only capacity is increased and such scenarios should not cause disruption to the backups. New nodes are created to allocate capacity for the cluster. The DDFS records the total and free capacity on the local data node database, the stats collector on VCM 302 aggregates the statistics into the VCM database 320. The VCM database can be queried using node identifiers. The new node creation process is invoked by the load balancer to allocate more capacity for the cluster to scale. The load balancer monitors the hypervisor resources allocated to the cluster. This will help the load balancer to make decisions on which host to create the target node. In certain cases, the load balancer should be aware of the native hypervisor resource schedulers (like VMware DRS) and take advantage of the resource scheduler features.

The load balancer process described herein allows deduplication backup systems to scale capacity as nodes are added, and in a manner that maintains, as much as possible, the deduplication within the datasets. It can scale the number of concurrent streams as nodes are added, and scale the number of Mtrees supported as nodes are added. Multi-stream performance should scale as more nodes are added, and single stream performance should not degrade compared to a single node of similar caliber. Overall global deduplication should not be significantly reduced compared to single node deduplication. A global namespace can be used across multiple nodes and the placement policy for files is determined by the DDFS internally to optimize for global deduplication. The system retains all Mtree level management interfaces. The system load balances the cluster by moving files or by moving collection partitions. High availability (HA) of the cluster is preserved by CP failover, as failure of a node does not bring down the entire cluster.

System Implementation

Embodiments of the processes and techniques described above can be implemented on any appropriate virtualized system including a backup system operating environment or file system, or network server system. Such embodiments may include other or alternative data structures or definitions as needed or appropriate.

Figure 6:
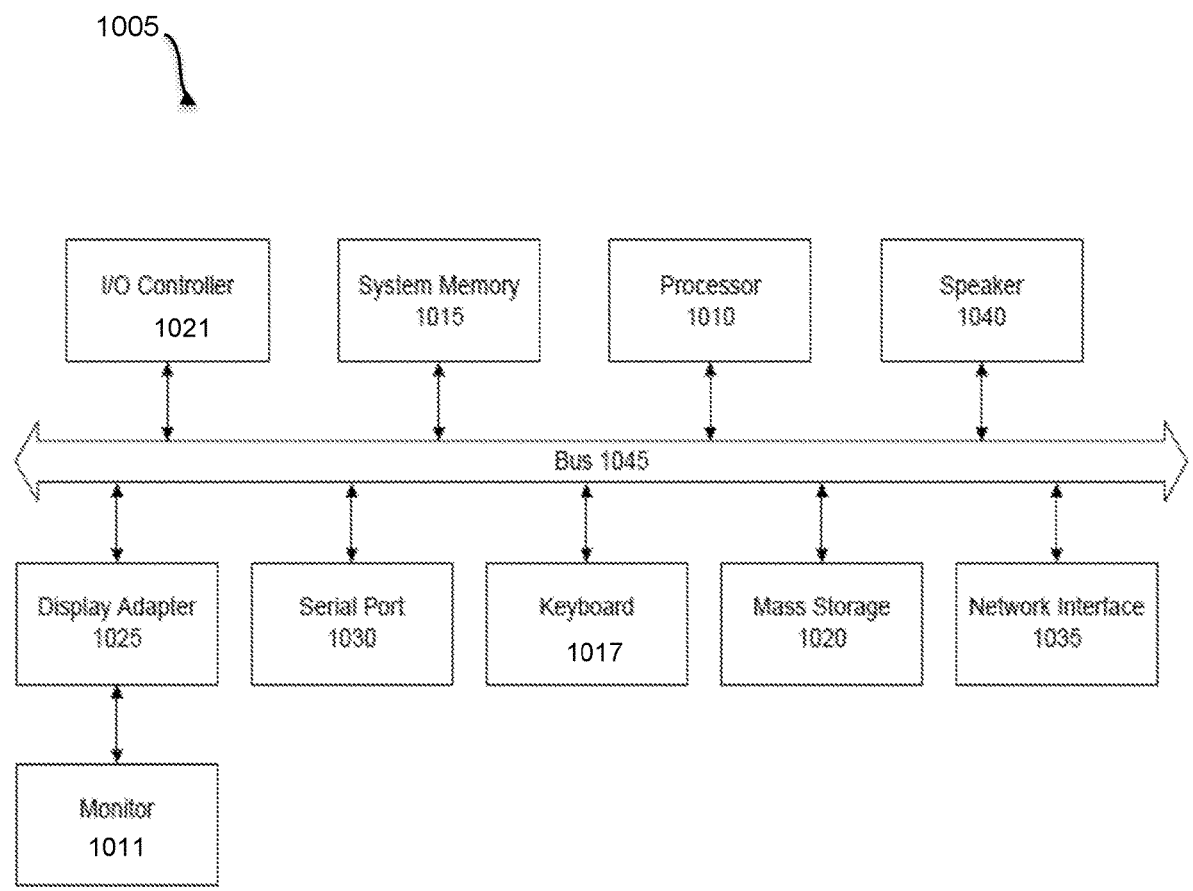
FIG. 6 is a system block diagram of a computer system used to execute one or more software components of the cluster system load balancer, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is intended to illustrate one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of balancing nodes comprising virtual machines (VMs) in a cluster system executing a deduplication backup process, comprising:
    presenting protocol-specific namespaces to clients for accessing a logical file system layer for the nodes;
    spreading an Mtree namespace among the nodes, wherein an Mtree stores files and directories for each protocol-specific namespace;
    balancing processor (CPU) cycles among the nodes by migrating data of the files and directories from a first node to a second node when a defined processor threshold of the first node is met or exceeded;
    balancing storage capacity of the nodes by migrating the data from the first node to the second node when a defined storage threshold of the first node is met or exceeded; and
    balancing streams processed in the system by migrating one or more streams processed by the first node to the second node when the number of streams is at a defined stream limit, wherein the stream number comprises a number of concurrently open files at a same time.

2. The method of claim 1 further comprising:
    monitoring each node to determine CPU, capacity, and stream usage statistics on a periodic basis; and
    compiling the usage statistics for storage in a single database on the node.

3. The method of claim 2 further comprising:
    aggregating the single databases for each node into an aggregated cluster database;
    querying the cluster database to determine if any node of the cluster has met or exceeded at least one of: the defined processor threshold, the defined storage threshold, and the defined stream limit.

4. The method of claim 3 further comprising:
    sending a first workflow command from the load balancer through a system manager to the second node to initiate migrating the data or migrating the one or the one or more streams based on the querying; and
    sending a second workflow command to a cluster inventory manager through the system manager to increase a capacity of the second node through a scale-up process, or spawn a new node as the second node through a scale-out process.

5. The method of claim 1 further comprising:
selecting data to evict from the first node in the event of exceeding a defined threshold or number of streams;
selecting a set of candidate nodes including the second node by identifying nodes that have sufficient capacity to store the evicted data; and
selecting the second node from the set of candidate nodes through an intersection process that compares the evicted data to an existing dataset in the second node and identifying which candidate node contains an existing dataset that most closely matches the evicted data to maintain deduplication of the evicted data.

6. The method of claim 5 further comprising selecting the second node at least in part in consideration of user actions comprising resource consumption, capacity, and performance parameters, and policies comprising resource consumption policies including new node allocations and node expansion, performance policies including capacity, CPU usage and deduplication, and provisioning policies.

7. The method of claim 5 wherein the thresholds and number of streams are set upon system configuration and dynamic during runtime based on usage.

8. The method of claim 1 further comprising balancing a network interface associated with the first node when the interface exceeds a specified line rate, by moving one or more network addresses associated with the interface to another interface in the first node or to an interface in the second node.

9. The method of claim 8 further comprising preserving a data locality of the data by aligning addresses with the data location.

10. The method of claim 1 wherein the deduplication backup process executed on a deduplication backup server running a Data Domain file system (DDFS).

11. A computer-implemented method of balancing nodes comprising virtual machines (VMs) in a cluster system executing a deduplication backup process, comprising:
presenting protocol-specific namespaces to clients for accessing a logical file system layer for the nodes;
spreading an Mtree namespace among the nodes, wherein an Mtree stores files and directories for each protocol-specific namespace;
sampling, on a periodic basis and on each node, usage data comprising a respective CPU cycle use, storage capacity, and stream number;
storing the usage data in a local database on each node;
collecting the data in the local database on each node for aggregation into a single database maintained on a cluster manager; and
querying, by a load balancer the single database to determine whether or not to initiate a file migration of the files and directories from a node that exhibits overuse based on defined storage and CPU thresholds, wherein the stream number comprises a number of concurrently open files at a same time.

12. The method of claim 11 wherein the load balancer is configured to:
balance the CPU cycles among the node by migrating data from a first node to a second node when a defined processor threshold of the first node is met or exceeded;
balance the storage capacity of the node by migrating the data from the first node to the second node when a defined storage threshold of the first node is met or exceeded; and
balance streams processed in the system by migrating one or more streams processed by the first node to the second node when the number of streams is at a defined stream limit, wherein the stream number comprises a number of concurrently open files.

13. The method of claim 12 further comprising:
selecting data to evict from the first node in the event of exceeding a defined threshold or number of streams;
selecting a set of candidate nodes including the second node by identifying nodes that have sufficient capacity to store the evicted data; and
selecting the second node from the set of candidate nodes through an intersection process that compares the evicted data to an existing dataset in the second node and identifying which candidate node contains an existing dataset that most closely matches the evicted data to maintain deduplication of the evicted data.

14. The method of claim 13 further comprising selecting the second node at least in part in consideration of user actions comprising resource consumption, capacity, and performance parameters, and policies comprising resource consumption policies including new node allocations and node expansion, performance policies including capacity, CPU usage and deduplication, and provisioning policies, wherein the thresholds and number of streams are set upon system configuration and dynamic during runtime based on usage.

15. The method of claim 11 further comprising:
balancing a network interface associated with the first node when the interface exceeds a specified line rate, by moving one or more network addresses associated with the interface to another interface in the first node or to an interface in the second node; and
preserving a data locality of the data by aligning addresses with the data location.

16. The method of claim 12 wherein the load balancer is further configured to:
select data to evict from the first node in the event of exceeding a defined threshold or number of streams;
select a set of candidate nodes including the second node by identifying nodes that have sufficient capacity to store the evicted data; and
select the second node from the set of candidate nodes through an intersection process that compares the evicted data to an existing dataset in the second node and identifying which candidate node contains an existing dataset that most closely matches the evicted data to maintain deduplication of the evicted data.

* * * * *